Aug. 20, 1963 M. H. ALLEN ETAL 3,101,184
MULTI-STORY MASON'S CORNER POLE AND ACCESSORIES THEREFOR
Filed Jan. 8, 1959 9 Sheets-Sheet 1

INVENTORS
MALCOLM H. ALLEN
HENRY A. BALINSKI
CORBIN E. GARTON
S. EUGENE HUBBARD
IRWIN D. OLSON

BY

ATTORNEY

INVENTORS
MALCOLM H. ALLEN
HENRY A. BALINSKI
CORBIN E. GARTON
S. EUGENE HUBBARD
IRWIN D. OLSON
BY
ATTORNEY

Aug. 20, 1963    M. H. ALLEN ETAL    3,101,184
MULTI-STORY MASON'S CORNER POLE AND ACCESSORIES THEREFOR
Filed Jan. 8, 1959    9 Sheets-Sheet 3
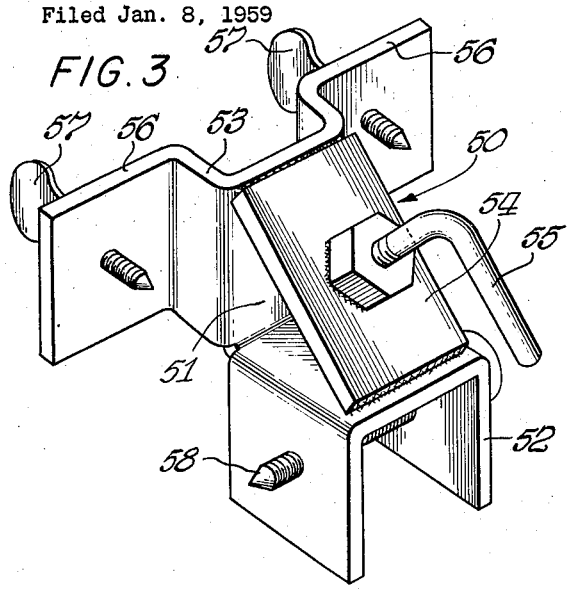
FIG. 3
FIG. 4
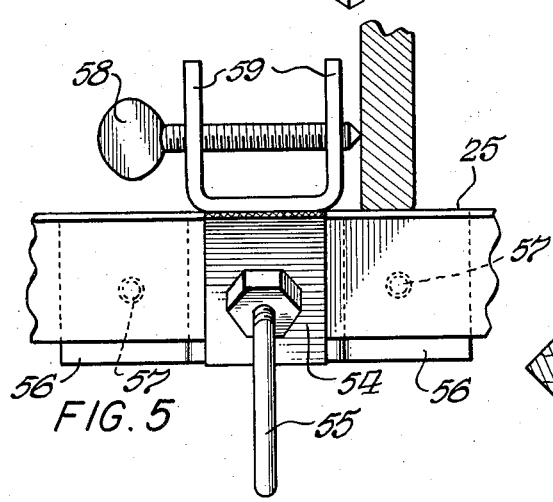
FIG. 5
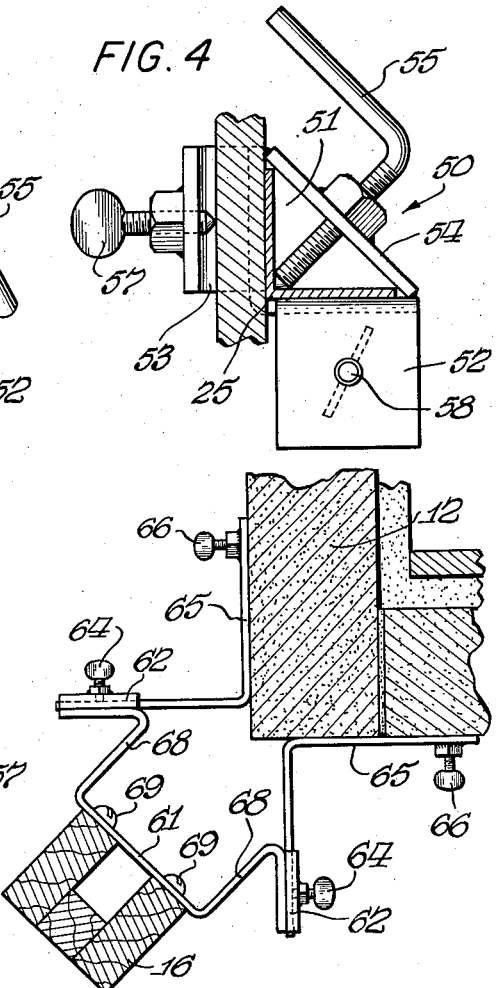
FIG. 7
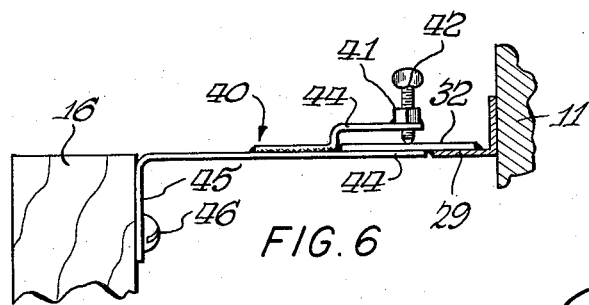
FIG. 6
INVENTORS
MALCOLM H. ALLEN
HENRY A. BALINSKI
CORBIN E. GARTON
S. EUGENE HUBBARD
IRWIN D. OLSON
BY
ATTORNEY

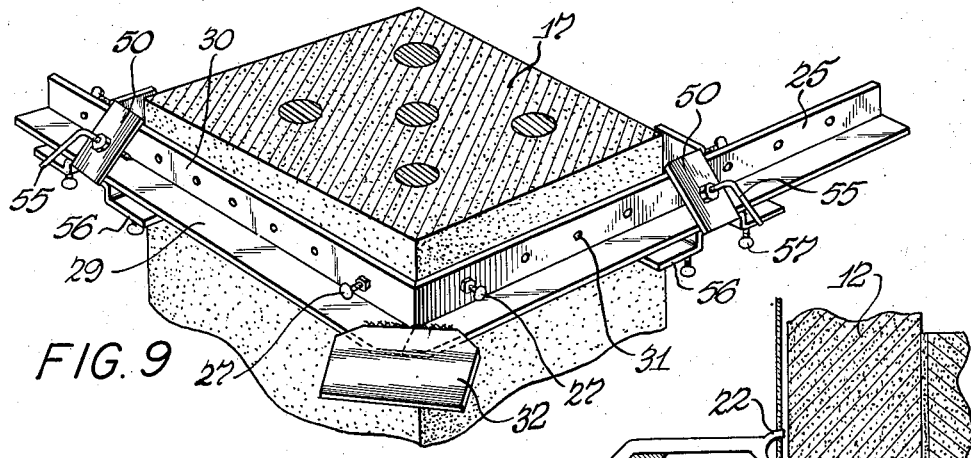
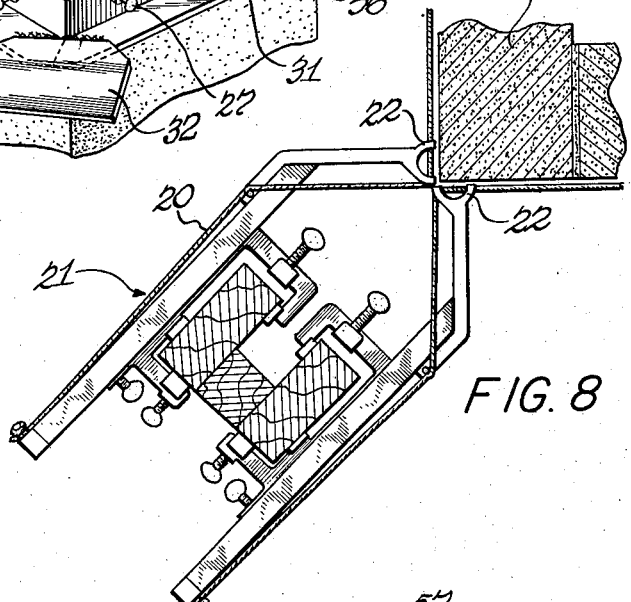
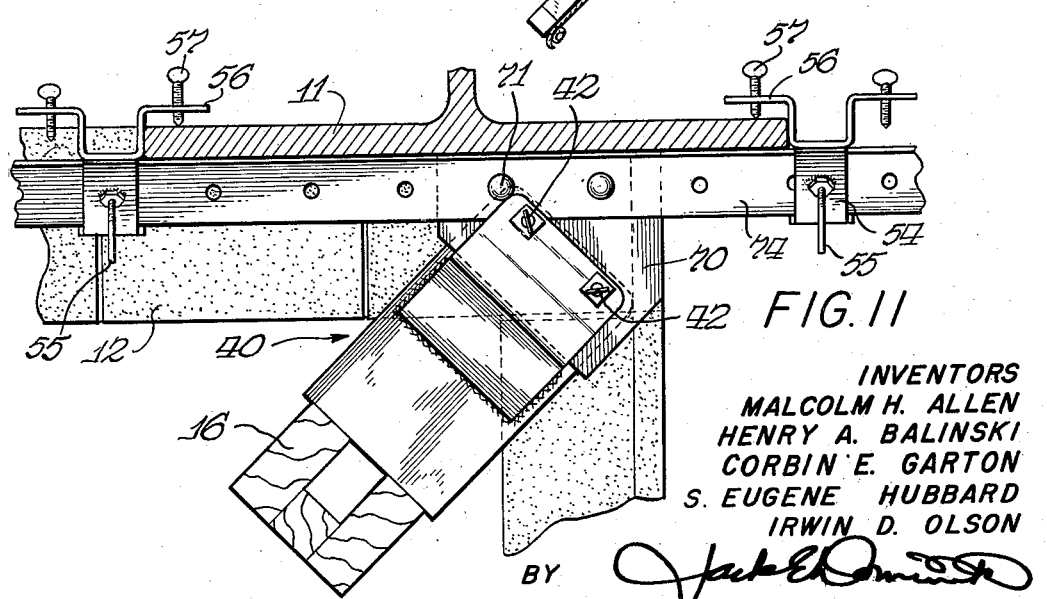

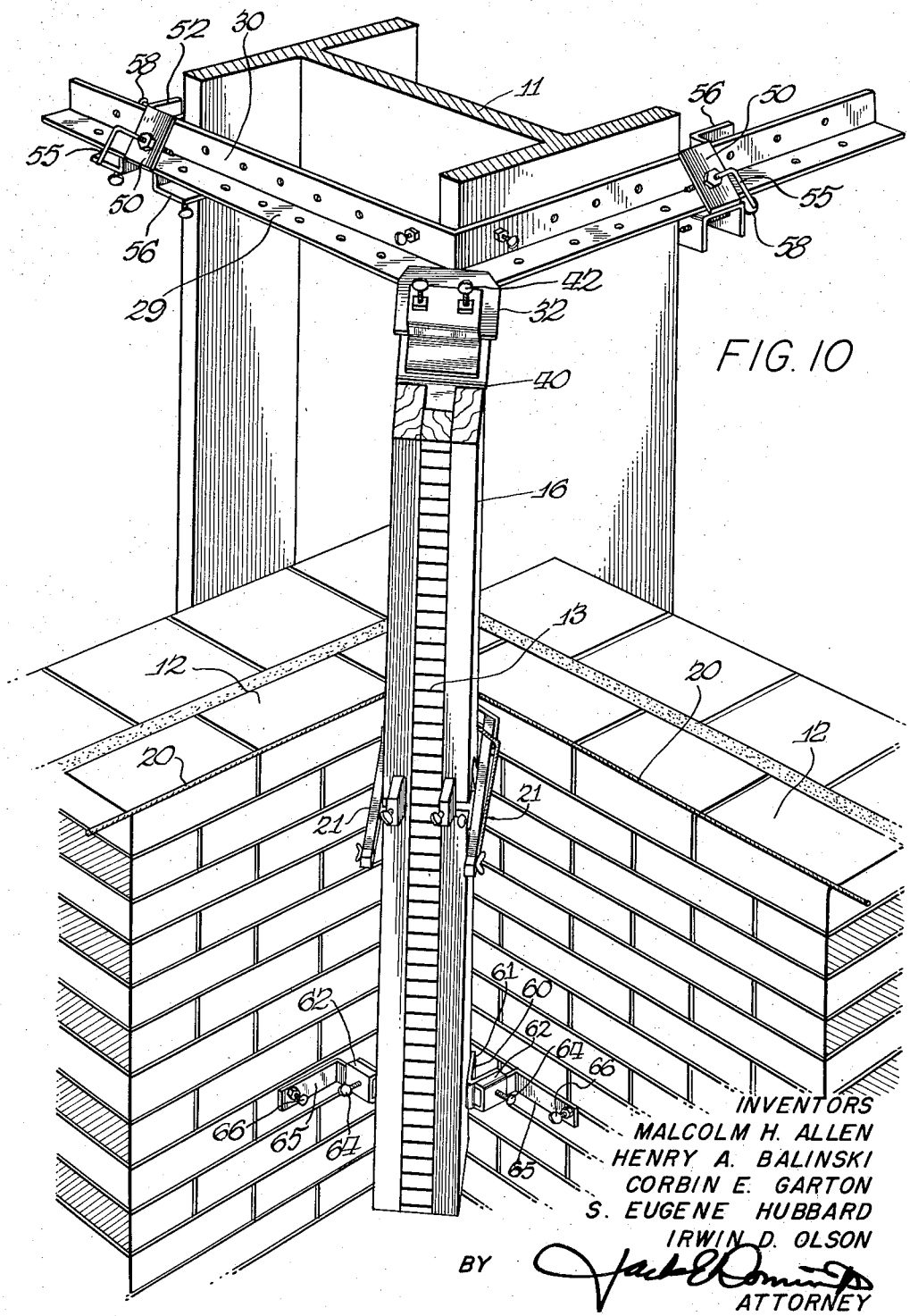

INVENTORS
MALCOLM H. ALLEN
HENRY A. BALINSKI
CORBIN E. GARTON
S. EUGENE HUBBARD
IRWIN D. OLSON
BY
ATTORNEY

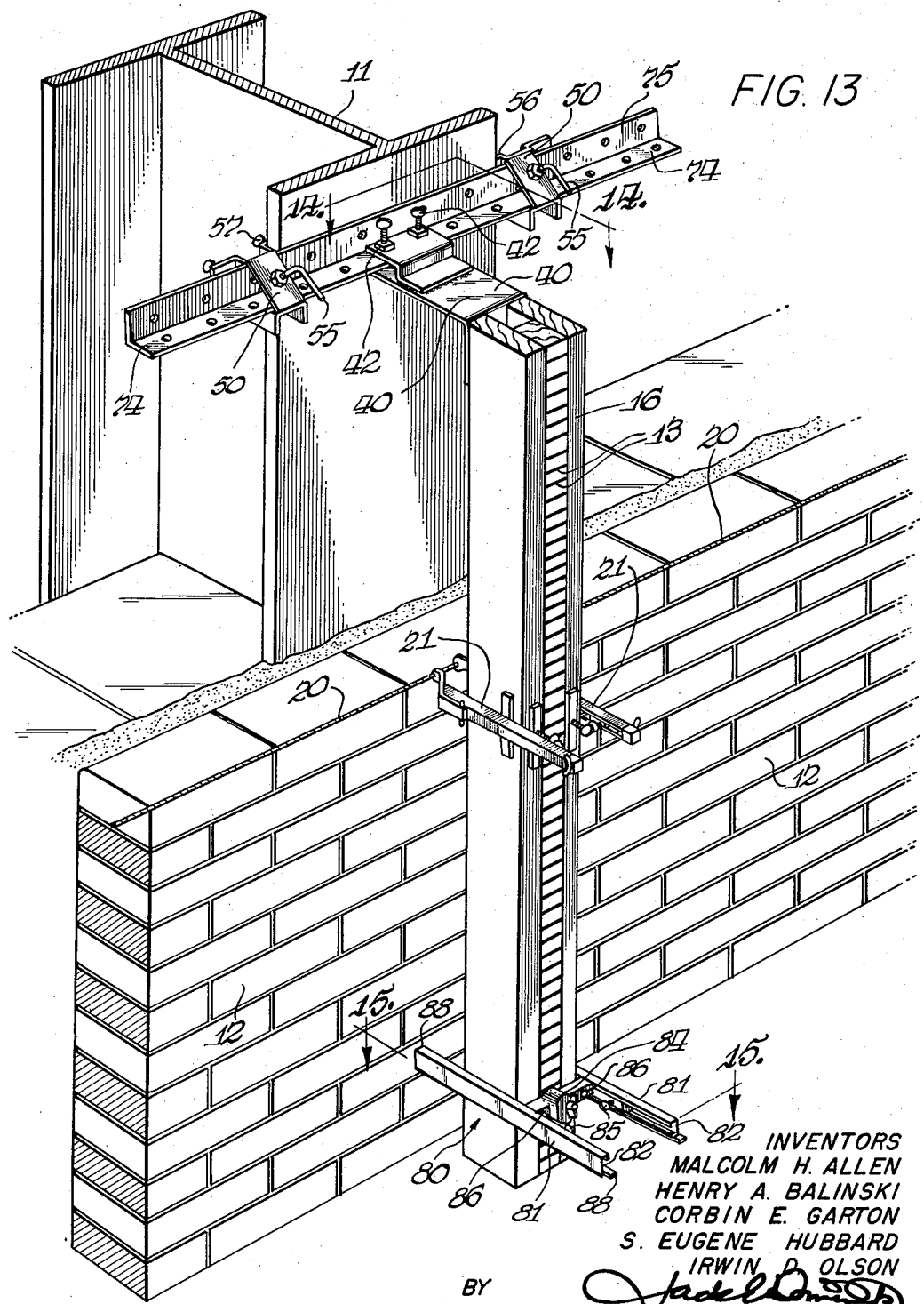

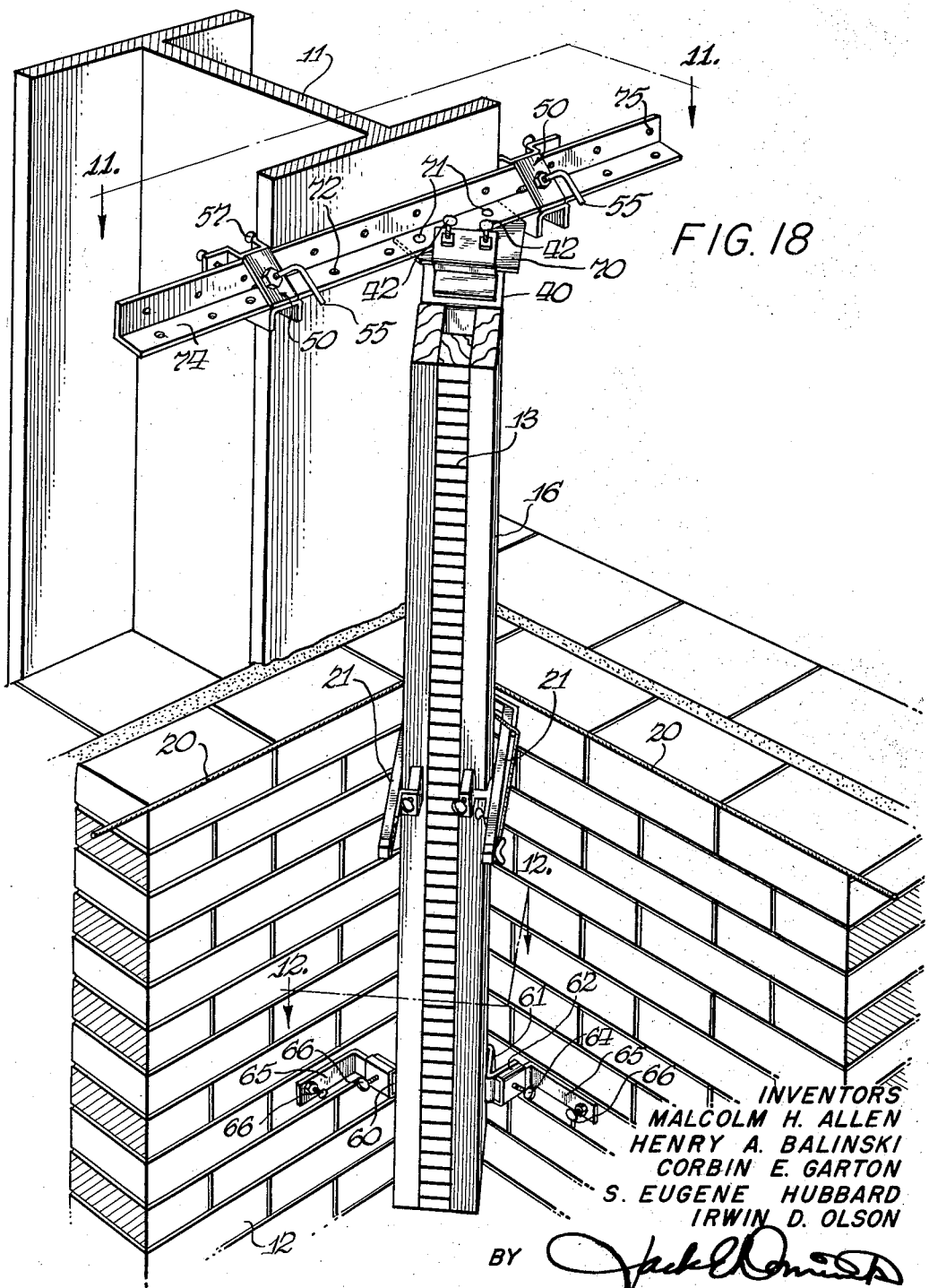

Aug. 20, 1963    M. H. ALLEN ETAL    3,101,184
MULTI-STORY MASON'S CORNER POLE AND ACCESSORIES THEREFOR
Filed Jan. 8, 1959    9 Sheets-Sheet 9
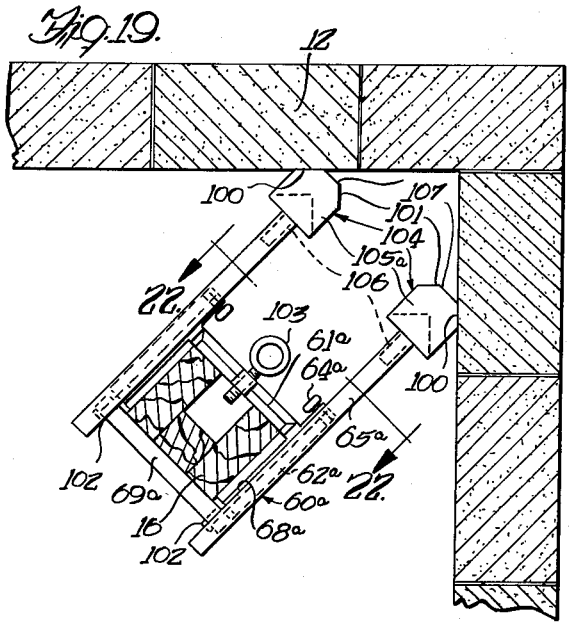
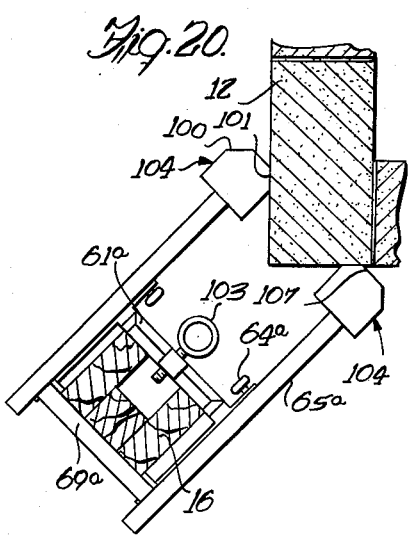
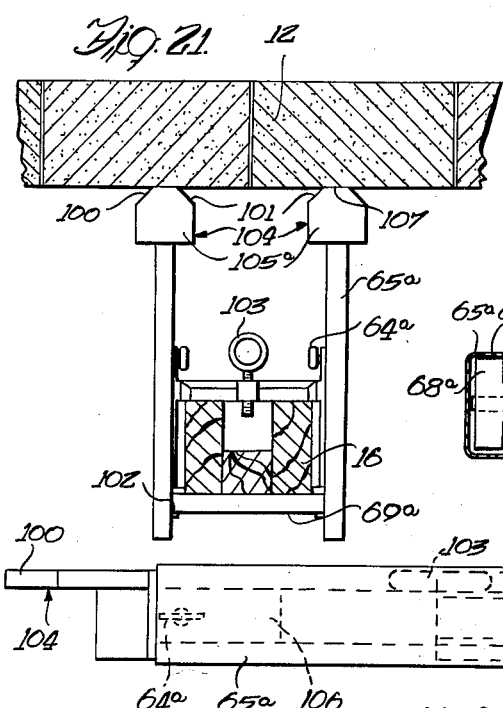
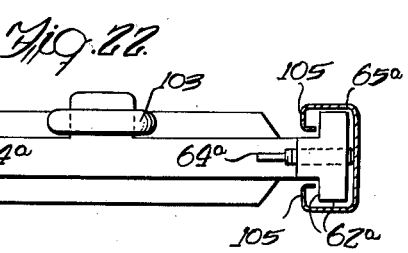
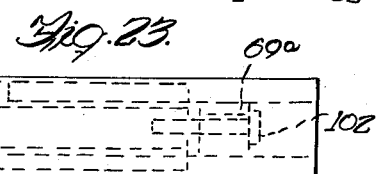
Inventors
Malcolm H. Allen, Corbin E. Gaxton
Irwin D. Olson
Henry A. Balinski
S. Eugene Hubbard
by Donald L. Welsh
Attorney

United States Patent Office 3,101,184
Patented Aug. 20, 1963

3,101,184
MULTI-STORY MASON'S CORNER POLE AND ACCESSORIES THEREFOR
Malcolm H. Allen, Geneva, Henry A. Balinski, Roselle, and Corbin E. Garton, Geneva, Ill., S. Eugene Hubbard, Niles, Mich., and Irwin D. Olson, Lombard, Ill., assignors to Structural Clay Products Research Foundation
Filed Jan. 8, 1959, Ser. No. 785,997
4 Claims. (Cl. 248—222)

This invention relates generally to a mason's aligning mechanism including vertical poles supported at various points along a wall of a multi-story building to facilitate the progressive vertical adjustment of a horizontal guide line. More particularly, the invention relates to mechanism for supporting the poles accurately in the vertical positions not only at salient and reentrant corners but also adjacent straight wall portions between corners.

One object of the invention is to provide novel aligning mechanism especially suited for multi-story skeleton frame constructions and adaptable readily to structural steel, reinforced concrete or other type of framing.

Another object is to provide a novel aligning mechanism which, with slight adjustments, may be used with equal facility at salient and reentrant corners as well as at points intermediate the corners.

A more detailed object is to provide novel corner pole accessories enabling a pole to be supported accurately in different reference locations and from different types of skeleton framework with slight adjustments of only a few parts.

Other objects and advantages of the present invention will become apparent from the following description and drawings in which:

FIG. 3 is a perspective view of the sliding mounting fixture employed to fix the mounting brackets to the vertical structural members illustrated in FIG. 1;

FIG. 4 is an end view in partial section of the mounting bracket shown in perspective in FIG. 3 shown clampingly engaging its associated structural member, taken along section line 4—4 of FIG. 2;

FIG. 5 is a top view in partial section of the sliding mounting bracket shown engaging its associated structural member compressively taken along section line 5—5 of FIG. 2;

FIG. 6 is a side view in partial section of the top bracket mount shown perspectively in FIG. 2, FIG. 6 being a frontal projection as viewed from position 6—6 in FIG. 2;

FIG. 7 is a plan view in partial section of the bottom spacing mechanism shown in FIG. 7 taken along section line 7—7 in FIG. 2;

FIG. 8 is a plan view in partial section of the guide lineholder and associated corner pole illustrated in FIG. 2, taken along section 8—8 as shown in FIG. 2;

FIG. 9 is a perspective view in partial section showing the top mounting bracket of FIG. 2 employed in association with a reinforced concrete column rather than the structural steel column illustrated in FIG. 2;

FIG. 10 is an enlarged perspective view in partial section showing a corner pole mounted at a reentrant corner in the location shown in FIG. 1 in the encircled portion numbered 2;

FIG. 11 is a plan view in partial section of the top mounting bracket shown in FIG. 10 taken along section line 11—11 of FIG. 18;

FIG. 13 is an enlarged partial section of the intermediate mounting of a corner pole such as shown in the encircled portion numbered 3 in FIG. 1;

FIG 18 is a perspective view of an alternative mounting at a reentrant or "inside" corner illustrating a different mounting to the structural steel column from that shown in FIG. 10;

FIG. 19 is a fragmentary sectional view similar to FIG. 12 and showing a modified base aligning mechanism at a reentrant corner;

FIG. 20 is a fragmentary sectional view similar to FIG. 7 and showing the modified base aligning mechanism at a salient corner;

FIG. 21 is a view similar to FIG. 15 of the modified base aligning mechanism at an intermediate location;

FIG. 22 is a sectional view taken along the line 22—22 of FIG. 19;

FIG. 23 is a side elevational view of the modified base aligning mechanism.

The invention contemplates a combination of structural elements which when employed with corner poles and guide lineholders permits the progressive alignment of the guide line for brick laying on a multi-story construction as the level of the brick wall construction is progressively elevated, each particular guide line being susceptible of independent elevation. By devising such a system, it is possible to employ the guide lineholder at any height and use its elements interchangeably in the various corner locations of a typical building site. In addition, the mechanism which will be described in detail permits attachment to any typical vertical structural member irrespective of its form as a structural steel column or reinforced concrete column. Additional adjustable features provided for in the construction of the various elements permit plumbing the pole with a minimum of effort and supervision. The interchangeability of the various parts reduces the cost to the user as well as insuring the availability of parts at the construction site.

*The Intended Usage*

Figure 1:
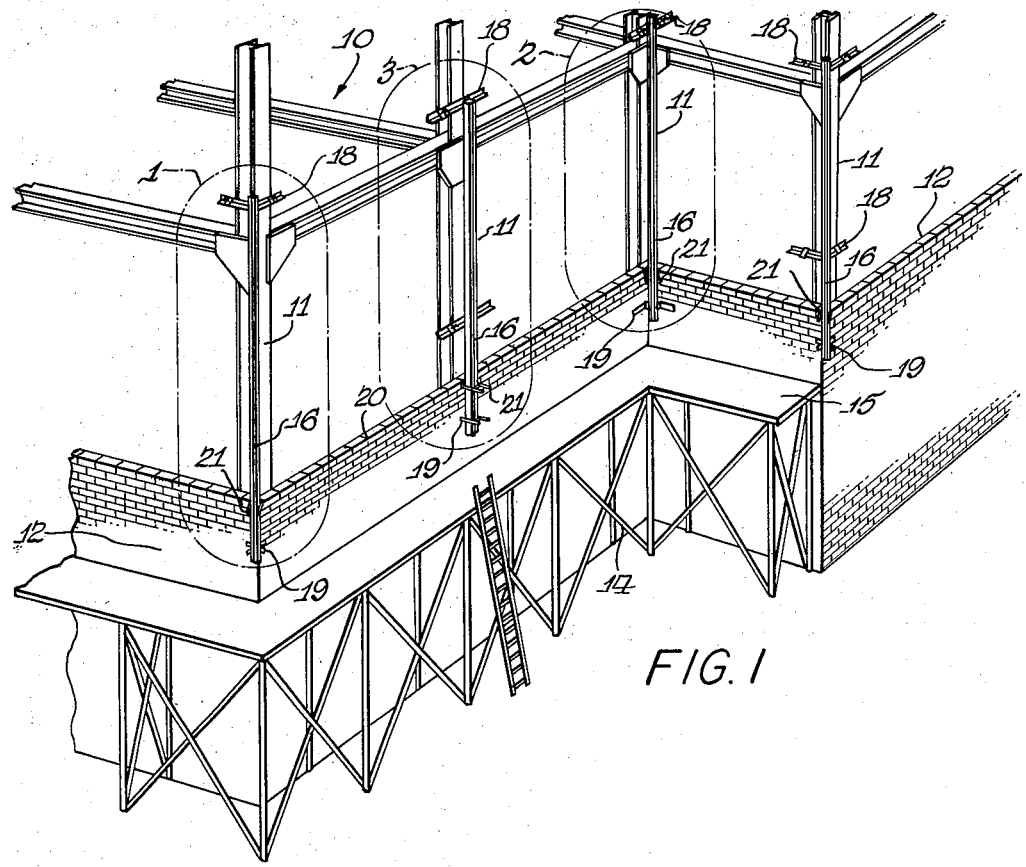
FIGURE 1 is a perspective view of a typical construction site showing typical locations of aligning mechanism embodying the present invention.

As will be seen by referring to FIG. 1 of the accompanying drawings, the present invention is intended for application in multi-story skeleton-frame construction. Referring now to the various numbered circled sections in FIG. 1, it will be seen that circle No. 1 illustrates a salient or "outside" corner to which a corner pole and guide lineholder has been fixed. There the structural member to which the assembly has been secured is a vertical structural steel column. The bottom portion of the assembly rests against the completed brick wall.

A reentrant corner is illustrated in circle No. 2 of FIG. 1. Sometimes such a corner will be referred to as an "inside" corner.

Because the wall spans between corners may be of considerable length, intermediate locations for the guide line support are often required. In circle No. 3 of FIG. 1, such an intermediate location is illustrated where the guide lineholder and associated corner pole are fixed to an intermediate vertical column, also shown as a structural steel column. As the detailed description proceeds, it will become apparent that the guide line corner poles can be readily secured to vertical reinforced concrete columns as well.

Referring now more specifically to the drawings, it will be seen that in FIG. 1 an unfinished building structure 10 is shown having vertical structural steel columns 11 surrounded by an unfinished brick wall 12. A vertically adjustable scaffolding 14 is employed to elevate the brick masons and other construction workers to the most convenient working level 15. A plurality of corner poles 16 are fixed at the various corners and at one intermediate station in the construction site. The corner poles 16 are fixed to the columns 11 at their upper portion by means of top mounting brackets 18, and spaced from the finished wall 12 at their lower portion by base brackets 19. It will be seen as this description proceeds that the top mounting brackets 18 and base brackets 19 may differ somewhat in form, although many of the elements are interchangeable; and indeed, some elements are common to each location. The mason's guide line 20 surrounds the perimeter of the building at the edge of the course of brick being laid. The mason's guide line 20 is secured by the guide lineholder 21 fixed to each of the corner poles 16.

The present invention stems from the development of the corner pole top mounting brackets 18 and bottom mounting brackets 19 and their combined operation with the corner poles 16 and guide lineholders 21. In operation, the corner poles 16 are fixed as shown in FIG. 1 to the building 10 and progressively elevated, story by story, as the wall 12 is built. This is accomplished in two steps: first, the guide lineholders 21 are progressively elevated along the corner poles 16 to the course marks 13 until they have traversed the major portion of the length of the corner poles 16, and, second, the corner poles and their associated mounting brackets 18, 19 are then elevated along the vertical columns 11 to a newer and higher station with the guide lineholders 21 being lowered to the lower portion of the corner pole 16 and then again progressively elevated as further courses of brick are added to the brick wall 12.

*Salient Corner Operation*

The details of the illustrative embodiment, as well as a thorough understanding of the invention, will be best appreciated as the use of the mounting brackets at the three types of locations are described in detail. Referring to FIG. 1, it will be best seen that circle No. 1 outlines a salient or "outside" corner, circle No. 2 outlines a reentrant or "inside" corner, and circle No. 3 outlines the intermediate supporting of a guide line pole.

Figure 2:
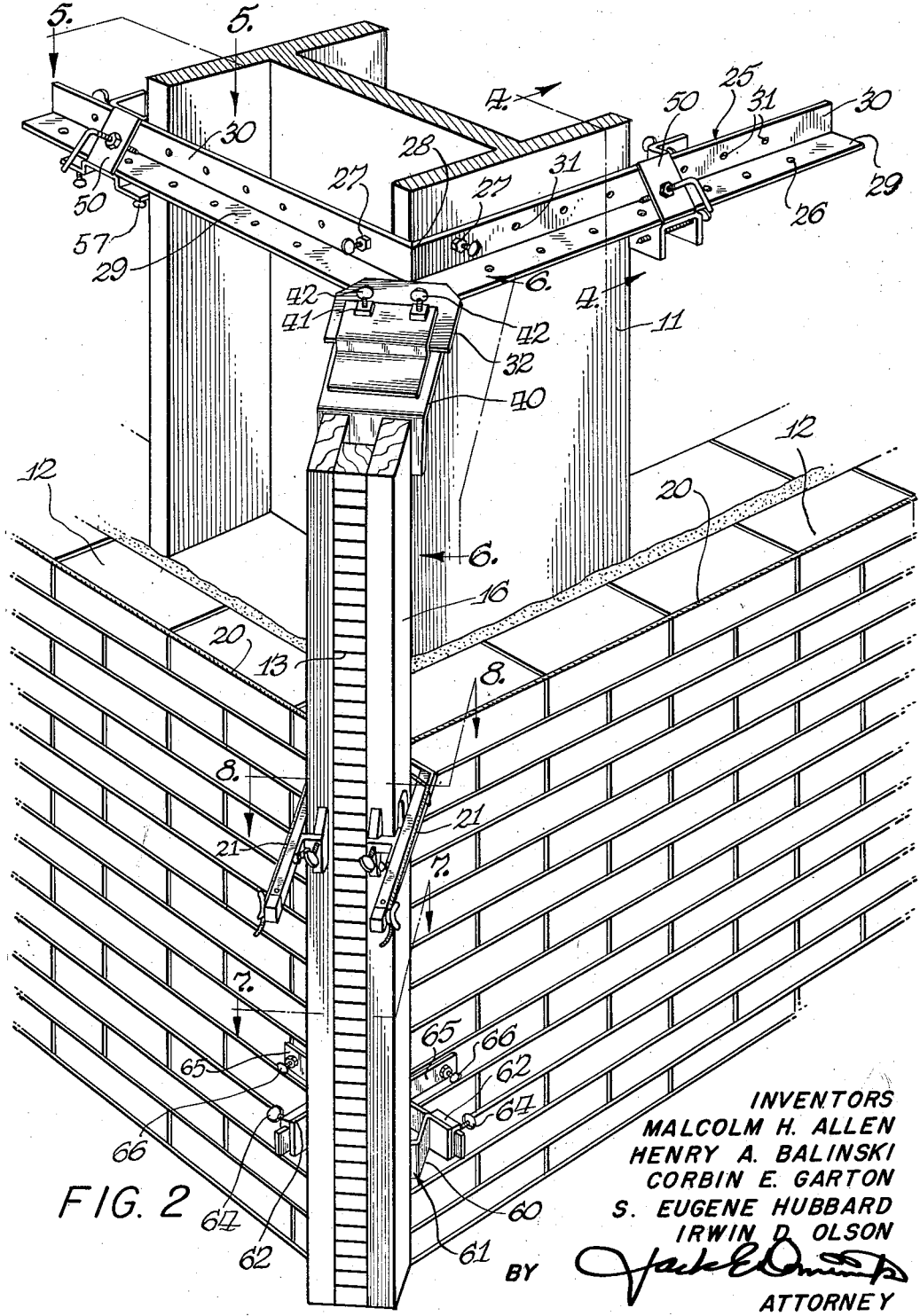
FIG. 2 is an enlarged perspective view in partial section showing that portion of the aligning device employed at a salient corner such as illustrated in the encircled portion numbered 1 in FIG. 1.

Referring now to FIG. 2, which illustrates perspectively in detail a salient or "outside" corner, it will be seen that the column 11 is a typical structural steel column. The column 11 forms the backbone of the corner where the brick walls 12 intersect. A guide line 20 is fixed in position to mark the height to which the individual bricks would be laid in each horizontal course of bricks. The guide lineholder 21 is fixed to the vertical corner pole 16 for progressive elevation as course upon course of bricks are added.

The top mounting bracket 25 comprises two legs 26 of an angle iron section joined at their intersection 28 as by welding. The angle iron legs 26 are positioned so that they present an outwardly extending flange 29, the vertical portion of the legs 30 having a plurality of nailing stations 31 in the form of equally spaced holes. The top mounting bracket 25 is secured to the structural steel column 11 by means of a unique mounting slide 50, the details of which will be described hereinafter. It is evident from the illustration in FIG. 2, however, that the slide 50 may be placed upon the angle bracket legs 26 in alternative locations so that in one instance it clamps one leg of the mounting bracket 25 to the flange of the column 11 and on the other leg the slider 50 compressively engages a face of the flange of column 11.

The corner pole 16 is secured at its upper portion to the top mounting bracket 25 by means of a top mounting angle bracket or clamp 40 which engages an extending tongue 32 of the top mounting bracket 25. The details of the top mounting clamp 40 will be discussed later, but it will be appreciated from the construction illustrated in FIG. 2 that it is dimensionally adjustable with relation to the top mounting bracket 25 because of the adjustable clamping mechanism 41 in the form of a pair of thumb screws 42 which removably secure the clamp to the bracket tongue 32.

At the lower end of the pole 16, there is provided a bottom mounting bracket 60 which is constructed in a novel manner for use at both salient and reentrant corners and is easily adjusted to obtain accurate location of the pole in a vertical position. To these ends, the bracket comprises generally parallel legs 68 which straddle the corner pole and slidably support feet 65 for individual adjustment relative to the pole and toward and away from the wall. Flat wall engaging surfaces on the outer ends of the feet lie in planes disposed at angles of 45 degrees with respect to the legs and 90 degrees with respect to each other for flat abutment of the surfaces with intersecting corner walls.

Figure 12:
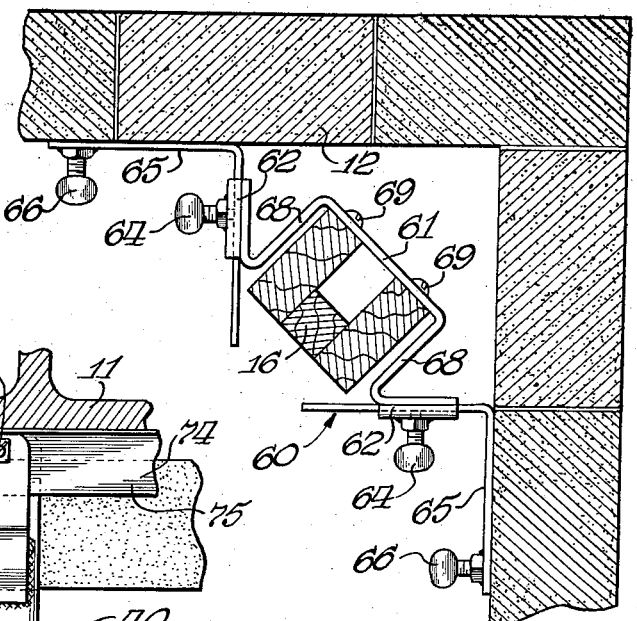
FIG. 12 is a plan view in partial section of the bottom spacing bracket employed with the corner pole mounting shown in perspective in FIG. 10 taken along section line 12—12 of FIG. 18.
Figure 14:
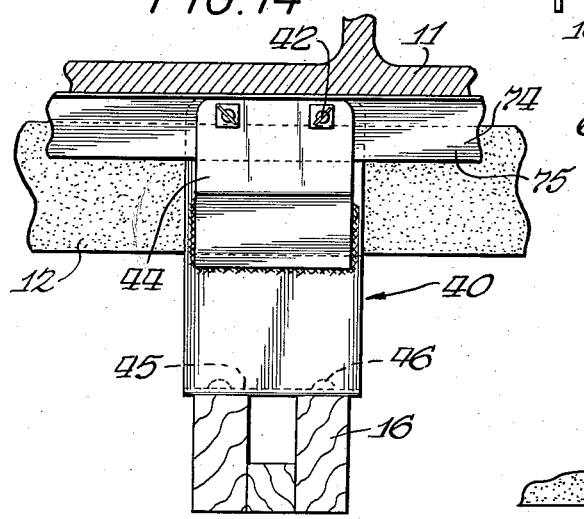
FIG. 14 is a top view in partial section of the top mounting bracket of the intermediate corner pole location shown in FIG. 13, taken along section line 14—14 of FIG. 13.

In the form of base mounting bracket 60 shown in FIGS. 7 and 12, the slides 62 carried by the bracket legs 68 and supporting the feet 65 are tubular members secured to angularly bent end portions of the legs and extending at angles of 45 degrees with respect to the legs. The latter are L-shaped members each having one part telescoping within one of the slides and its other part providing the flat outwardly facing surface for abutment with a wall. To secure each foot in adjusted position relative to the bracket, thumb screws 64 are threaded into the slides to clamp the feet to the slide. Additional adjustment may be provided, if desired, by other thumb screws 66 threaded into the wall engaging parts of the feet. The bracket in this instance is of U-shaped and the parallel legs 68 are joined integrally by a cross bar or bottom 61 which is secured to the corner pole by screws.

Where the corner pole 16 is located at a salient corner, the bracket 60 is secured to the pole with its legs 68 extending toward the intersecting walls and with the wall engaging surfaces of the feet 65 disposed at an acute included angle of 90 degrees as shown in FIG. 7. For reentrant corners as will be described later, the bracket 60 is reversed so that the legs 68 lie on opposite sides of the pole as shown in FIG. 12 and the feet 65 are reversed in the slides 62 so that the wall engaging surfaces, although lying in planes which intersect at 90 degrees, face outwardly away from each other rather than toward each other as they did at the salient corner.

Provisions also are made for independently adjusting the bracket at the top of the corner pole. There, thumb screws 42 at the top mounting clamp 40 permit the corner pole 16 to be adjusted with relation to the mounting bracket 25. The mounting bracket 25 has additional adjustment means in the form of thumb screws 27 which adjust it with relation to the column 11. Additional alignment can be achieved through the adjustable features of the guide lineholder 21 to be more fully outlined later.

Reentrant Corner Operation

Referring now to FIG. 10, it will be seen that the corner pole 16 has been mounted for operation in a reentrant or "inside" corner. The guide lineholders 21 have been again fixed to the corner pole 16 and support the guide line 29 at a preselected location along the upper course of bricks in the brick wall 12. At the bottom the corner pole 16 is spaced from the brick walls 12 by means of the feet 65 which are adjustably secured within the slides 62 of the bracket support 61 by means of thumb screws 64.

It will be apparent from comparing the bottom mounting brackets employed at the reentrant or "inside" corner illustrated in FIG. 10 with the bottom mounting bracket 60 employed at the salient or "outside" corner illustrated in FIG. 2 that the mechanism is the same, the parts having been interchanged with relation to each other. This relationship may be more fully understood by referring to FIGS. 7 and 12 where it will be seen that the principal difference between the employment of the bottom mounting bracket 60 in the two corner locations is the technique whereby the U-shaped support bracket 61 has been fixed to the corner pole 16. In the case of the salient or "outside" corner as shown in FIG. 7, the legs 68 of the U extend away from the corner pole 16, whereas in the reentrant or "inside" corner illustrated in FIG. 12 the legs 68 of the U-shaped bracket 61 flank the bulk of the corner pole 16. In both instances, conventional screws or bolts 69 have been employed to secure the corner pole 16 to the U-shaped clamp 61.

The corner pole is fixed to the column 11 at its upper portion in the same manner as illustrated in FIG. 2 at a salient corner. The bracket 30 is secured to the steel column 11 by means of a sliding clamp 50, the corner pole being secured to the bracket 30 by means of the mounting plate 40 being secured to the bracket tongue 32.

An alternative mounting of the corner pole is illustrated in FIG. 18. There it will be seen that the lower portion of the corner pole 16 is mounted as described above. At its upper portion, however, the corner pole 16 is secured to the mounting clamp 40. Instead of engaging a tongue 32 fixed to the top mounting bracket as in the case of the salient or "outside" corner, the clamp 40 engages a removable tongue 70 which is secured by bolts 71 through two holes being a part of a plurality of holes 72 extending along the outwardly projecting flange 74 of the top mounting angle 75 employed at the reentrant or "inside" corner. The top mounting bracket 75 is secured to the flanges of the column 11 by means of the slides 50, shown in the present instance as clampingly engaging the flanges of the column 11.

Adjustability at the reentrant or "inside" corner is achieved by means of the selective engagement of the thumb screws 42 of the mounting clamp 40 to the removable secured tongue 70. At the lower end of the corner pole 16, the adjustment is achieved by varying the positions of the feet 65 with respect to the slides 62 or the positions of the thumb screws 66 at the ends of the bottom mounting bracket feet 65. Adjustment, of course, can also be achieved through the means provided therefor on the guide lineholder 21.

It will be apparent from the foregoing that in one instance at a reentrant or "inside" corner the top mounting bracket which is employed at a salient or "outside" corner serves also to support the top of the corner pole 16. Depending upon the location of the vertical column at the reentrant or "inside" corner, the mounting bracket employed at intermediate locations may be used as illustrated in FIG. 18, or the salient corner mounting bracket 50 employed as illustrated in FIG. 10. In both instances, the sliders 50 are employed to engage the vertical columns thus illustrating their flexibility in application and common usage with the corner poles 16.

Intermediate Support

Referring now to FIG. 13, it will be seen that the same mechanism which is used for clamping the angle bracket 75 to the column 11 at a reentrant or "inside" corner is also employed in the case of the intermediate location of the corner pole 16 as illustrated. The slides 50 coact with the mounting bracket 75 and the column 11 to securely fix the bracket to the column. The mounting clamp 40 is then fixed at one leg to the upper portion of the corner pole 16, and by means of thumb screws 42 clamped against the extending flange 74 of the mounting bracket 75 at its other end. Adjustability both laterally and longitudinally may be achieved by the selective engagement of the mounting clamp 40 with the extending flange 74 of the top mounting bracket 75. The guide lineholders 21 are again employed in their fashion to hold the guide line 29 along the brick wall 12, permitting the step by step raising of the guide line 29 as each additional course of brick is laid.

The intermediate bottom mounting bracket 80 (see FIGS. 15 and 16) depends for its operation on a pair of legs 81 which present internally facing channeled inner portions 82 into which an H-shaped transverse adjustable clamping bracket 84 is inserted. One pair of set screws 85 serve to longitudinally adjust the clamp 84 between the legs 81. Another set screw 86 serves to fix the bottom mounting bracket to the corner pole 16. At the rearward portion of the legs 81 of the bottom intermediate mounting bracket 80 are a pair of tangs 88 which engage the brick wall between the bricks at the mortared joints when this bracket is employed as a bottom fitting in load bearing wall construction. In the present application, however, the legs are reversed and the flat ends of the legs 81 abut the wall. It will be appreciated that complete longitudinal adjustment of the bottom positioning of the corner pole 16 may be achieved through this mounting. Lateral adjustment is achieved by skipping the ends of the support legs 81 along the brick wall 12.

Interchangeability—Sliding Clamp

One of the principal points of interchangeability in the aligning device described evolves from the employment of a unique sliding clamp 50 illustrated in detail in FIGS. 3, 4 and 5. There it will be seen that a right triangular box 51 is formed by the intersection of the abutment clamp 52 with the overlapping clamp 53 and the clamping screw support plate 54. The clamping screw 55 threads through its support plate 54 and engages the associated angle bracket 25 thereby adjustably securing the sliding clamp 50 to the angle bracket 25 at any point along its length. The overlapping clamp member 53 has a pair of external ears 56 containing thumb screws 57 which engage pertinent portions of the flange of an associated column. The compression mounting clamp 52 (as best illustrated in FIG. 5) has a transverse engaging thumb screw 58 which threadedly pierces the legs 59 of the clamp 52. It will be appreciated that by rotating the position of the slide box 51 with relation to the associated angle bracket 25 the relative locations of the mounting clamp 53 and compression clamp 52 may be reversed thereby insuring interchangeability of operation.

Thus far in the description of the operation of the device, the function of the slide 50 has been shown as engaging a structural steel column 11. In FIG. 9, it will be seen how the same slide 50 with the same salient corner mounting bracket 25 may be employed to engage a reinforced concrete column 17. In review, it will be seen that the unique slider 50 is employed with top mounting brackets on both salient and reentrant corners, as well as at intermediate locations. In addition, it functions equally well with steel or reinforced concrete columns.

Bottom Bracket

The bottom mounting bracket 60 employed on salient or "outside" and reentrant or "inside" corners shown respectively in FIGS. 2, 10 and 18 is illustrated in greater detail in FIGS. 7 and 12. In FIG. 7, the bottom mounting bracket is shown as engaging a salient or "outside" corner where the feet 65 abut the wall 12 and slide within the end slides 62 of the mounting bracket 61 and are secured thereto by means of thumb screw 64. The corner pole 16, in this instance, is fixed to the external portion of the U-shaped mounting bracket 61 by means of bolts or screws 69. The slides 62 angle backwardly from the legs 68 of the U-shaped mounting bracket 61 at an angle of approximately 45 degrees.

When the same bottom mounting bracket 60 is employed in a reentrant or "inside" corner such as illustrated in FIG. 12, the corner pole 16 is nested flankingly between the legs 68 of the U-shaped bracket 61. The feet 65 which abut the wall 12 are then reversed in their sliding engagement with the slides 62 and secured by means of thumb screws 64. It will be apparent from the geometric relationship of the various parts that the legs 68 of the U-shaped clamp 61 must be of sufficient length so that the legs of the mounting foot 65 do not interfere with the back portion of the corner pole 16 when it is nested between the legs 68 of the U-shaped bracket 61.

Figure 15:
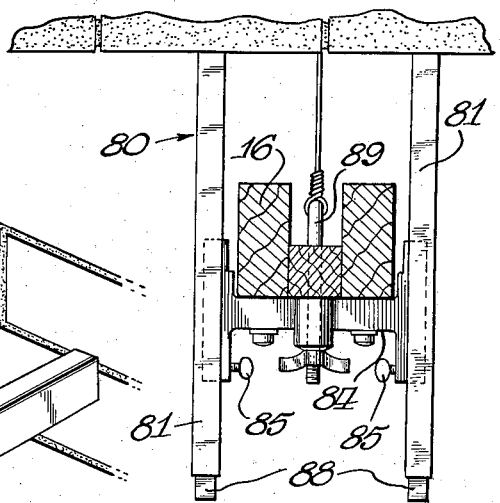
FIG. 15 is a top view in partial section of the bottom spacing bracket of the intermediate corner pole location illustrated in FIG. 13 taken along section line 15—15 of FIG. 13.
Figure 16:
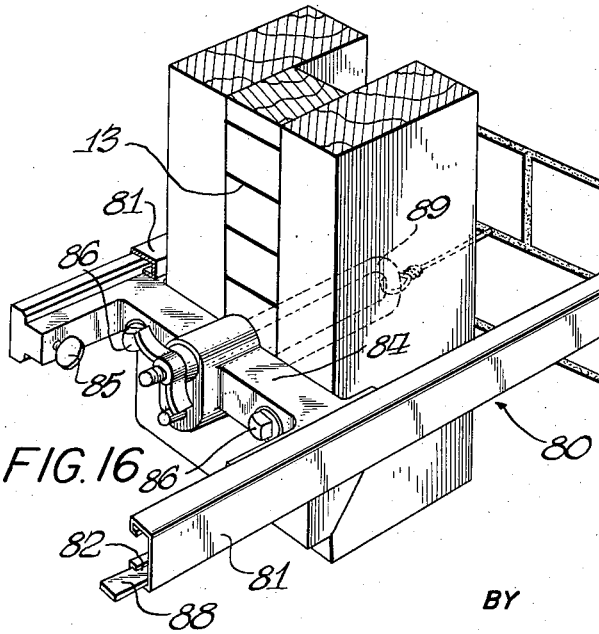
FIG. 16 is an enlarged perspective partial section of the intermediate corner pole bottom spacing bracket shown in FIG. 15 also taken along section line 15—15 of FIG. 13.

The intermediate location bottom holder 80 is shown in FIGS. 15 and 16. The adjustability of the cross brace 84 with relation to the legs 81 was discussed above. Here it will be seen that a J-bolt 89 is employed to secure the cross brace 84 to the corner pole 16. Often a wire 87 is imbedded in the wall and secured to the J-bolt 89 at its looped end.

Top Brackets

Figure 17:
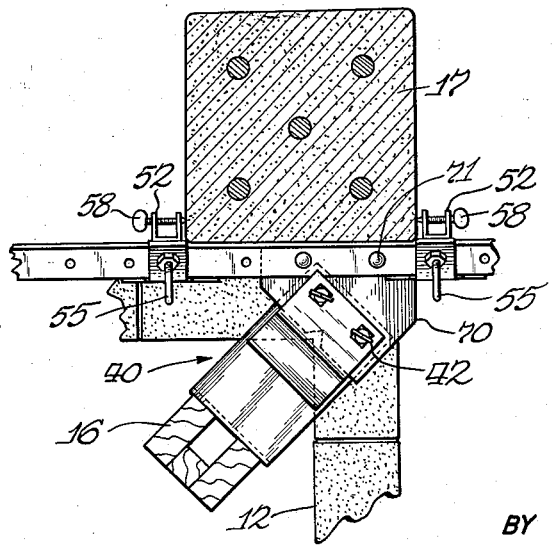
FIG. 17 is a top view in partial section of a corner pole mounted at a reentrant corner such as illustrated in FIG. 10 illustrating the employment of the top mounting bracket on a reinforced concrete column instead of a structural steel column as illustrated in FIG. 10.

The top mounting brackets are illustrated in FIGS. 6, 10, 11, 14, 17 and 18. In some instances, the top mounting bracket 40 is shown as employed with the replaceable tongue 70 reentrant or "inside" corner locations such as illustrated in FIGS. 11 and 17. There it will be seen, as described above, that the top bracket thumb screws 42 are employed to bias the jaws 44 of the top clamp and clampingly receive the adjustable tongue 70.

The top clamp 40 may also be employed to secure the corner pole to the permanent tongue 32 at the salient corner mounting bracket 25. The relationship of the corner pole 16, the top clamp 40, and the tongue 32 is best illustrated in FIG. 6. FIGS. 6 and 18 show this location of the top clamp 40. It will be seen that the top clamp 40 has a depending corner pole mounting leg 45 which is secured by means of a bolt or similar fastener 46 to the corner pole 16.

Referring now to FIG. 13, the relationship of the pole top clamp 40 to the corner pole 16 at an intermediate location is shown. There it will be seen that the angle mounting bracket 75 is engaged by the thumb screws 42 clamping the depending flange 74 of the intermediate mounting bracket 75 between the jaws 44 of the top clamp. Lateral adjustment is provided for along the entire length of the top clamp bracket 75. Longitudinal adjustment may be achieved insofar as the width of the depending flange 74 permits.

The view in FIG. 17 shows how the top mounting clamp 40 is employed where a reinforced concrete column 17 is engaged at a reentrant or "inside" corner as readily as the mounting is secured to a steel column. In FIG. 10 the mounting clamp 40 is shown where the salient corner mounting bracket 25 has been employed at a reentrant corner because the column location is fully within the inside portion of the building structure. It will be seen that in this instance the tongue 32 is engaged in the same fashion as at a salient or "outside" corner.

Guide Lineholder

The guide lineholder 21 appears illustrated in greater detail in FIG. 8. There it will be seen that the guide line 20 has a pair of semi-circular guides 22 at the forward portions to assist in bending the guide line 20 and aligning it along the brick wall 12 extending in the instance shown, around a salient or "outside" corner. The use of the guide lineholder at intermediate positions and at "inside" or reentrant corners is shown respectively in FIGS. 13 and 10. Additional details and an outline of the detailed operation of the guideline holder 21 may be seen in Patent No. 2,715,777.

In review, it will be seen that the mechanism disclosed and described provides for progressively elevating a mason's guide line around the perimeter of a multistory construction with wall lengths and heights of unlimited dimensions. Interchangeability of parts and ease of fabrication has been combined with a rugged simplicity permitting a wide range of adjustments in all locations.

An alternative form of base mounting bracket is illustrated in FIGS. 19 to 23. As in the construction described above, the modified bracket 60a comprises parallel legs 68a extending along opposite sides of and secured to the corner pole 16 and slidably supporting feet 65a. End surfaces 100 and 101 on the latter lie in vertical planes which intersect each other at an angle of ninety degrees and the legs at angles of forty-five degrees for engagement of the surfaces with salient and reentrant corner walls. The slides 62a in the modified construction are defined by the external surfaces of the bracket legs which telescope within the feet. Herein, the legs are straight bars of T-shaped cross section spanned by a crosspiece 61a cast integral with the legs and adapted to abut against one side of the corner pole. The opposite side of the pole is engaged by a clamping member in the form of a bar 69a paralleling the crosspiece and receiving bolts 102 which are threaded into the legs and, when tightened down, clamp the pole between the bar and the crosspiece. An eyebolt 103 is threaded into the crosspiece for connection to one end of a tie wire (not shown) like the wire 87 in FIG. 15.

The feet 65a of the modified construction of FIGS. 19 to 23 are elongated bars of U-shaped cross section fitting onto the bracket legs and having blocks 104 secured to and projecting beyond corresponding ends and providing the wall engaging surfaces 100 and 101. Inturned flanges 105 on the longitudinal edges of the feet are pressed outwardly into clamping engagement with inwardly facing surfaces on the bracket legs by thumb screws 64a threaded into the legs. Each of the blocks 104 includes a wall engaging plate 105a, a mounting portion 106 cast integral with the plate and telescoping within and suitably secured to one end of its supporting bar 65a. The wall engaging surfaces 100 and 101 are formed on one edge of the plate 105a.

To enable the same base mounting bracket 60a to be used at both salient and reentrant corners without changing the positions of the feet 65a on the legs 68a and, also, at intermediate locations between corners, there are three flat wall engaging surfaces on each block. Of these, an outwardly facing surface 100 for reentrant corner walls (FIG. 19) and an inwardly facing surface 101 for salient corner walls (FIG. 20) are disposed at angles of ninety degrees with respect to each other and forty-five degrees as in the case of the wall engaging surfaces of the feet 65 in the different positions shown in FIGS. 7 and 12. Intermediate the corner wall engaging surfaces 100 and 101 on each block 104 is a flat surface 107 which is normal to the longitudinal axis of the foot for abutment with flat wall surfaces intermediate corners as shown in FIG. 21.

It will be apparent that the alternative base mounting bracket 60a operates in a manner similar to the other brackets 60 and 80 of FIGS. 1 to 18 except that the only adjustments necessary are positioning of the feet 65a on the legs 68a whether the corner pole 16 is located at or intermediate corners. This simplification of the base mounting construction is made possible by the formation of the three different wall engaging surfaces 100, 101 and 107 on each of the individually adjustable feet.

This application is a continuation-in-part of our co-pending application Serial No. 503,666, filed April 25, 1955, now abandoned.

We claim as our invention:

1. For use with a mason's aligning device comprising a plurality of corner poles, a corner pole base aligning mechanism for salient and reentrant corner use in compressively engaging the erected brick wall characterized by a bracket adapted to be secured to a corner pole and having generally straight parallel legs, slides supported on corresponding ends of said legs and each having a straight portion intersecting the associated leg at an angle of 45 degrees, a pair of feet of L-shape adapted for adjustably engaging an associated wall and each having two legs intersecting at right angles, one of said legs of each of said feet slidingly mating with a different one of said bracket slides, adjustable wall engaging means on the other leg of each of said feet, and means on each of said slides for selectively fixing the sliding leg of the associated foot within the slide.

2. For use with a corner pole adapted to be suspended from one end portion in a vertical position adjacent the intersecting walls of salient and reentrant corners of buildings, a base aligning mechanism comprising a bracket adapted to be secured to the lower end portion of said pole and having generally parallel legs lying in a horizontal plane, attachment means on said bracket for securing the same detachably to said pole with said legs straddling the pole, a pair of feet having end portions and supported individually on said legs for adjustment along the axes of the legs and horizontally relative to said pole and toward and away from the intersecting walls to dispose the end portions at different distance from said pole, said end portions of said feet having flat surfaces adapted for abutting engagement with intersecting walls at salient and reentrant corners and lying in vertical planes intersecting each other at an angle of 90 degrees and the longitudinal axes of said legs at 45 degrees.

3. For use with a corner pole adapted to be suspended from one end portion in a vertical position adjacent the intersecting walls of salient and reentrant corners of buildings, the combination of a base mounting bracket adapted to be secured to the lower end portion of said pole and having generally parallel legs lying in a horizontal plane and disposed at opposite sides of the pole, attachment means on said bracket for securing the same detachably to said pole, a pair of feet terminating in end portions and having mounting portions telescoping individually with said legs for adjustment horizontally relative to said bracket and said pole and toward and away from the intersecting walls to dispose the end portions at different distances from said pole, said end portions of said feet having flat surfaces adapted for abutting engagement with intersecting walls at salient and reentrant corners and lying in vertical planes intersecting each other at an angle of 90 degrees and the longitudinal axes of said legs at 45 degrees.

4. For use with a corner pole adapted to be suspended from one end portion in a vertical position adjacent the intersecting walls of salient and reentrant corners of buildings, a base aligning mechanism comprising a bracket adapted to be secured to the lower end portion of said pole and having generally parallel legs lying in a horizontal plane, attachment means on said bracket for securing the same detachably to said pole with said legs straddling the pole, a pair of elongated foot members terminating in end portions and supported individually on said legs for adjustment along the axes of the legs and horizontally relative to said pole and toward and away from the intersecting walls to dispose the end portions at different distances from said pole, said end portion of each of said feet having one flat surface normal to the longitudinal axis of the foot and two other flat surfaces adapted for abutting engagement with intersecting walls at salient and reentrant corners and lying in vertical planes intersecting each other at an angle of 90 degrees and the axis of the leg at 45 degrees.

References Cited in the file of this patent

UNITED STATES PATENTS

| | | |
|---|---|---|
| 939,741 | Raehn | Nov. 9, 1909 |
| 1,745,814 | Sadler | Feb. 4, 1930 |
| 1,872,860 | Winter | Aug. 23, 1932 |
| 2,194,800 | Ley | Mar. 26, 1940 |
| 2,296,217 | Maloney | Sept. 15, 1942 |
| 2,609,582 | Kindorf | Sept. 9, 1952 |
| 2,717,751 | Kusiv | Sept. 13, 1955 |
| 2,761,214 | Ruble | Sept. 4, 1956 |